C. W. DAVIS.
TERMINAL FOR ELECTRIC CABLES.
APPLICATION FILED JUNE 19, 1909.
990,234.
Patented Apr. 25, 1911.
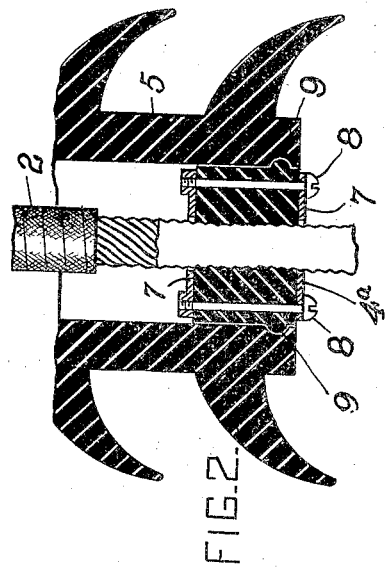
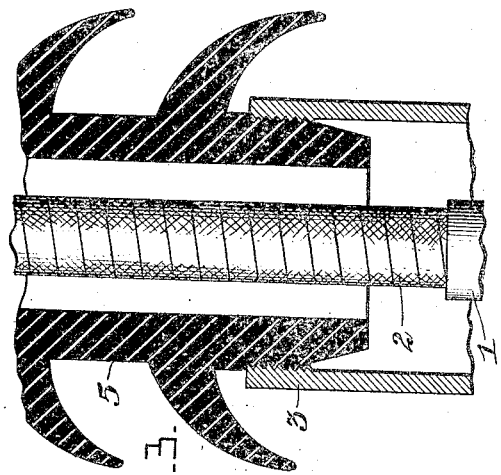
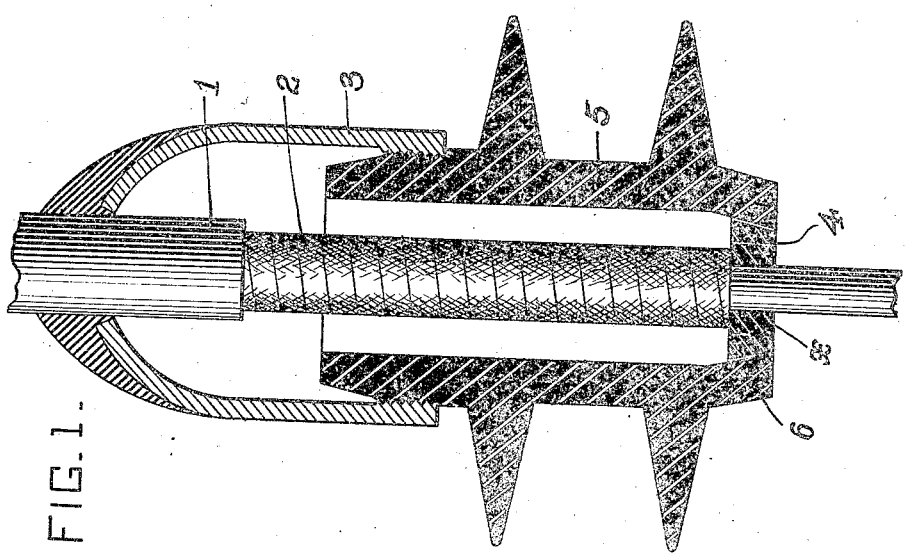
WITNESSES:
J. Herbert Bradley
Theodore F. Duff
INVENTOR
Charles W. Davis,
by Christy and Christy
Attys

UNITED STATES PATENT OFFICE.

CHARLES W. DAVIS, OF EDGEWORTH, PENNSYLVANIA, ASSIGNOR TO STANDARD UNDERGROUND CABLE COMPANY, OF PITTSBURG, PENNSYLVANIA, A CORPORATION OF PENNSYLVANIA.

TERMINAL FOR ELECTRIC CABLES.

990,234.   Specification of Letters Patent.   Patented Apr. 25, 1911.

Application filed June 19, 1909. Serial No. 503,228.

*To all whom it may concern:*

Be it known that I, CHARLES W. DAVIS, residing at Edgeworth, in the county of Allegheny and State of Pennsylvania, a citizen of the United States, have invented or discovered certain new and useful Improvements in Terminals for Electric Cables, of which improvement the following is a specification.

The invention described herein relates to certain improvements in terminal heads for the protection of the portion of the cable adjacent to the place from which the insulation has been removed for connection with the aerial line.

The invention is hereinafter more fully described and claimed.

In the accompanying drawings forming a part of this specification, Figure 1 is a sectional view illustrating a construction of terminal adapted for use where the end of the cable is turned down for connection with the aerial; Fig. 2 illustrates a modification of the structure shown in Fig. 1. In Fig. 2 the petticoats formed superficially on the casing of the terminal are in shape somewhat different from those shown in Fig. 1. Fig. 3 illustrates a further modification in the shape of the petticoat, adapting the terminal to an upward-extending cable end.

After the sheath 1 and insulation 2 have been removed from the cable core for a suitable distance from the end a thimble 3 is slipped onto the cable. The stopper 4 formed of resilient, water-proof material is then forced onto the conductor sufficiently far to rest against the insulation 2, as shown. The sleeve 5, which is formed of insulating material and is preferably provided with an inclined shoulder or contracted portion 6, is passed over the stopper until its inclined shoulder bears against the periphery of the stopper and exerts a compressive force thereon, so that tight joints will be formed between the conductor and stopper and between the stopper and the insulating sleeve. The thimble is then connected, as by a threaded joint, to the insulating sleeve, and attached to the lead sheath, preferably by a wiped solder joint.

In the construction shown in Fig. 2, metal plates 7 are placed on opposite sides of the stopper 4ª, and these plates are drawn toward each other by screws 8, thereby causing the stopper to spread inwardly against the conductor and outwardly against the sleeve. If desired, grooves 9 may be formed in the sleeve for the reception of portions of the disk-shaped stopper, thereby locking the latter in position in the sleeve.

When the closing element or stopper is formed of rubber, the portion $x$ in contact with the conductor should be unvulcanized, as indicated in Fig. 1, to prevent injury to the conductor from the sulfur commonly present in excess in vulcanized rubber. When the conducting element is formed of twisted strands, as indicated in Fig. 2, it is preferred to fill the interstices between the strands with solder at that part of the conductor to be surrounded by the stopper, so as to prevent the escape of insulating material from the sleeve, and also to prevent the entrance of moisture by capillary action along the interstices between the strands. Where the conducting element is so covered with solder, the sleeve closing element may be formed of vulcanized rubber throughout.

When the insulating sleeve is formed of material requiring a glazed surface to render it impervious to moisture, it is preferred to leave that portion of the inner surface against which the rubber stopper bears, unglazed, as the rubber will form a very tight and strong joint with such unglazed surface.

I claim herein as my invention:

1. In a terminal structure for an electric cable, the combination of a thimble secured to the cable sheath, a sleeve formed of non-conducting material and connected to the thimble, and a stopper formed of resilient material compressed into tight engagement upon the bared conductor of the cable and upon the inner surface of the sleeve, substantially as described.

2. In a terminal structure for an electric cable the combination of a thimble secured to the sheath of the cable, a sleeve formed of non-conducting material secured to the thimble and provided with a shoulder, and a stopper of resilient material compressed to form tight joints around the bared conductor and upon the adjacent portion of the sleeve, substantially as described.

3. In a terminal structure for an electric cable the combination of a thimble secured to the sheath of the cable, a stopper formed of india-rubber and held under compression surrounding the bared conductor and having the portion in contact with the conductor unvulcanized, and a non-conducting sleeve secured to the thimble and provided with a shoulder upon which shoulder the said stopper makes engagement, substantially as described.

4. In a terminal structure for an electric cable the combination of a thimble secured to the sheath of the cable, a stopper of resilient material surrounding the bared portion of the conductor and bearing against the insulation of said conductor, and a sleeve formed of non-conducting material and provided with an inwardly inclined shoulder bearing on the periphery of the stopper, and when the parts are assembled coöperating with the insulation of said conductor to hold said resilient stopper under tension, substantially as described.

5. In a terminal structure for an electric cable the combination of a thimble secured to the cable sheath, a rubber stopper fitting closely around the bared conductor of the cable, and an insulating sleeve having a glazed exterior surface connected at one end to the thimble and engaging periphery of the stopper at the opposite end, the portion bearing on the stopper being unglazed.

In testimony whereof, I have hereunto set my hand.

CHARLES W. DAVIS.

Witnesses:
 CHARLES BARNETT,
 FRIEDA E. WOLFF.